United States Patent [19]  
Gould et al.

[11] 4,241,614  
[45] Dec. 30, 1980

[54] POWER TAKE-OFF

[76] Inventors: Wayne P. Gould, 1106 Hooksett Rd., Hooksett, N.H. 03106; Raymond J. Chouinard, 41 Granite St., Suncook, N.H. 03275

[21] Appl. No.: 45,338

[22] Filed: Jun. 4, 1979

Related U.S. Application Data

[63] Continuation-in-part of Ser. No. 848,510, Nov. 4, 1977, abandoned.

[51] Int. Cl.³ .............................................. F16H 7/12
[52] U.S. Cl. .................................... 74/15.63; 474/117
[58] Field of Search .................. 74/15.4, 15.63, 242.8, 74/242.11 R, 242.11 C, 242.1 TA, 242.12, 242.13 R, 242.15 R

[56] References Cited

U.S. PATENT DOCUMENTS

| 1,657,747 | 1/1928 | Halmet | 74/15.63 |
| 2,584,512 | 2/1952 | Strait | 74/242.11 R |
| 2,743,679 | 5/1956 | Lofton | 74/221 X |
| 3,018,667 | 1/1962 | Spietz | 74/242.9 |
| 3,132,596 | 5/1964 | Dinger | 74/242.15 R |
| 3,306,121 | 2/1967 | Jenkins | 74/242.15 R |
| 3,613,462 | 10/1971 | Stibbe | 74/15.4 |
| 3,702,570 | 11/1972 | Stikkers | 74/242.13 R |
| 4,061,448 | 12/1977 | Grondeck | 74/15.63 X |
| 4,077,272 | 3/1978 | Busso | 74/242.11 C X |

FOREIGN PATENT DOCUMENTS 1023633  1/1958  Fed. Rep. of Germany ........ 74/242.12

Primary Examiner—C. J. Husar  
Assistant Examiner—Moshe I. Cohen

[57] ABSTRACT

A power take-off has a bracket attached to a truck engine and provided with a pivoted arm to the outer end of which the pump of a hydraulic system is attached and by which the pump pulley is positioned above and in alignment with a drive shaft pulley. Adjustable resilient means yieldably oppose movement of the pump pulley towards the drive shaft pulley and maintain the connecting belt under wanted tension. The arm may be depressed against the opposition of the resilient means to permit the belt to be easily removed or replaced.

6 Claims, 4 Drawing Figures

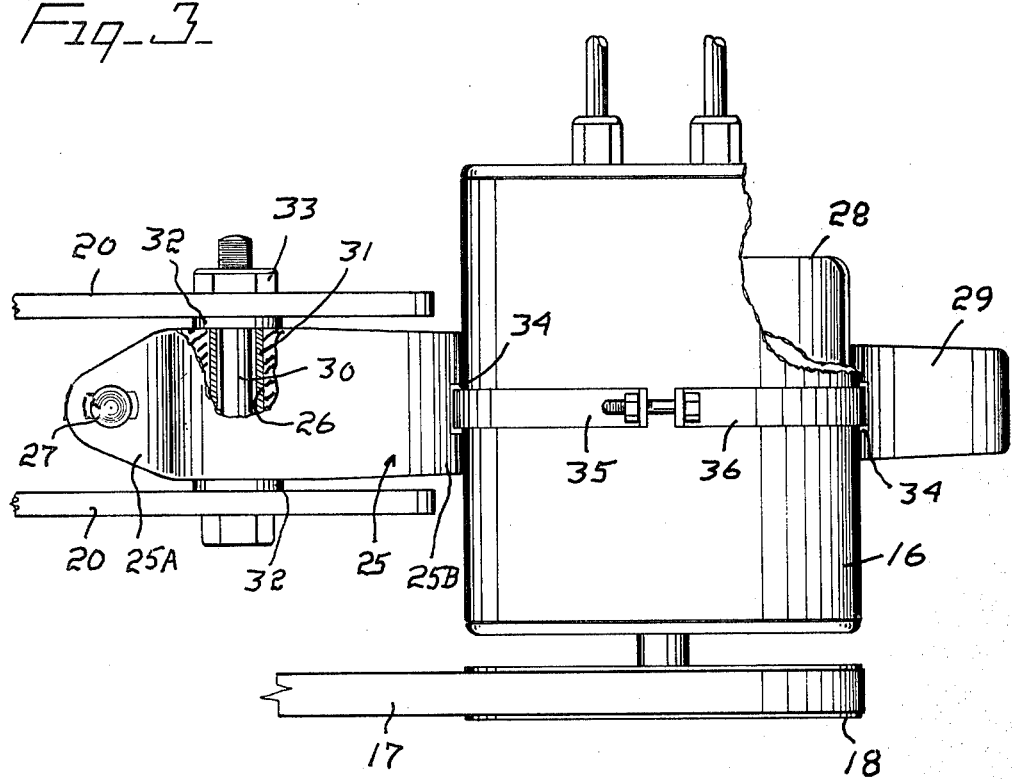
Fig_3_
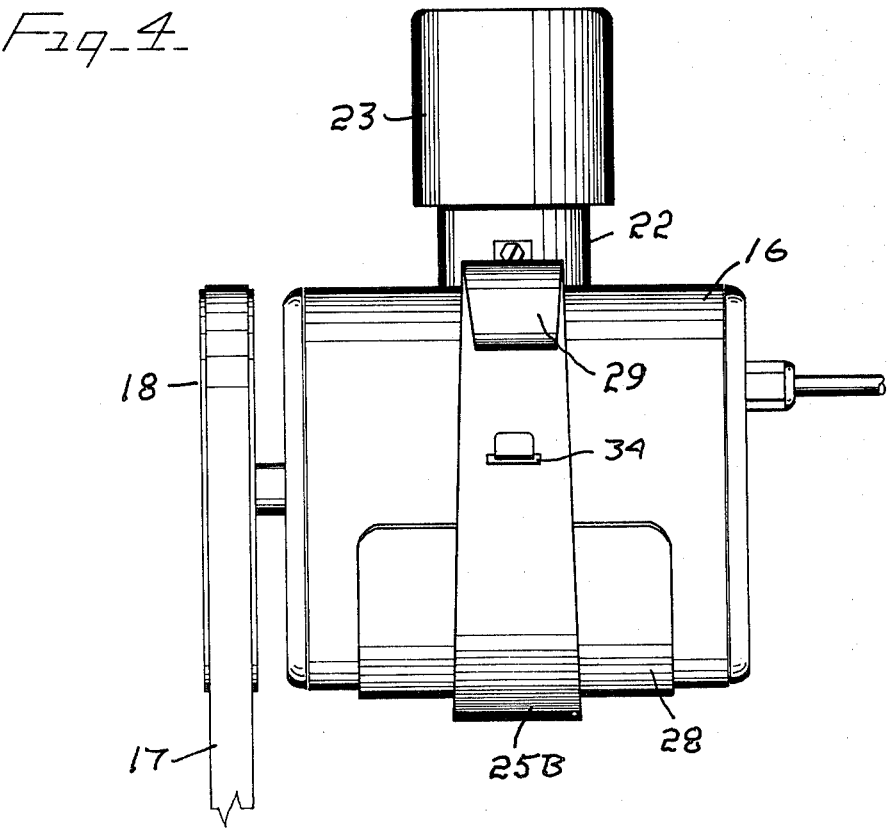
Fig_4_

POWER TAKE-OFF

The present application is a continuation-in-part of Ser. No. 848,510, filed Nov. 4, 1977 now abandoned.

BACKGROUND REFERENCES

U.S. Pat. No. 1,657,747
U.S. Pat. No. 2,743,679
U.S. Pat. No. 3,018,667
U.S. Pat. No. 3,613,462

BACKGROUND OF THE INVENTION

Many trucks are provided with hydraulic systems the pumps of which are driven by their engines. A common such system is one used to control the position of a snow plow.

Because of the time required to remove or replace the belt by which the pump pulley is connected to a pulley fixed on the exposed end of the crankshaft of the engine, it is the usual practice, once a winter season has started, to leave the pump of the hydraulic system connected until the plowing season is over. This custom results in a substantial waste of gasoline and, in addition, pump and belt wear thus increasing the chances of a breakdown during the plowing season.

In order for a belt to be removed, it is necessary to loosen the nuts of the bolts by which the pump is attached to a bracket so that the pump may be moved to an extent permitting the belt to be freed after which the nuts are again tightened. Belt replacement requires the reverse procedure plus the necessity of properly adjusting the tension on the replaced belt.

THE PRESENT INVENTION

The general objective of the present invention is to provide a power take-off that will enable the belt by which the pump of a hydraulic system is connected to a pulley on an engine drive shaft to be removed or replaced with maximum ease and convenience, an objective attained with a unit having a bracket attachable to the engine and an arm pivotally connected to the bracket. Means are provided to enable the pump to be secured to the outer end of the arm with the pump pulley above and at one side of but aligned with a pulley fixed on the drive shaft of the engine. Adjustable resilient means are attached to the bracket so engage the other or inner end of the bracket as to yieldably hold the pump from movement from a first position into a second position in which it is sufficiently nearer the drive shaft pulley to enable a belt to be placed in trained engagement with the two pulleys or removed therefrom with the resilient means, in the first named position, providing the wanted tension on the belt when in service.

One important objective of the invention is to provide that the distance between the pivot axis of the arm and the outer portion thereof is substantially greater than the distance between the pivot axis and the location where the resilient means exerts belt tightening pressure on the inner end of the arm in order to provide such mechanical advantage that the operator, by engaging the extremity of the outer arm portion with one hand may easily depress the pump and hold it depressed using one hand with the other hand free to remove or replace the belt, an objective requiring that the inner portion of the arm be very short.

In accordance with the invention, this objective is attained with a connection between the resilient means and the inner arm end including a rod backed by the spring with the rod having a rounded end entrant of a seat with which the inner arm end is provided.

An important objective of the invention is to provide that the rod may move independently of the spring as required by the pivoting of the arm, an objective attained with a rod holder to which the spring pressure is applied and which so freely receives the upper end of the rod that the rod may tilt to the necessary extent as the outer arm end is manually depressed and the inner end again depressed by the resilient means when the operator releases his hold.

Other objectives of the invention will be apparent from the specification and the appended claims.

BRIEF DESCRIPTION OF THE DRAWINGS

The accompanying drawings illustrate a preferred embodiment of the invention with FIG. 1 a somewhat schematic front view of a truck engine provided with a power take-off in accordance with the invention;

FIG. 3 is a top plan view thereof; and

FIG. 4 is an end view of the take-off.

THE PREFERRED EMBODIMENT OF THE INVENTION

Figure 1:
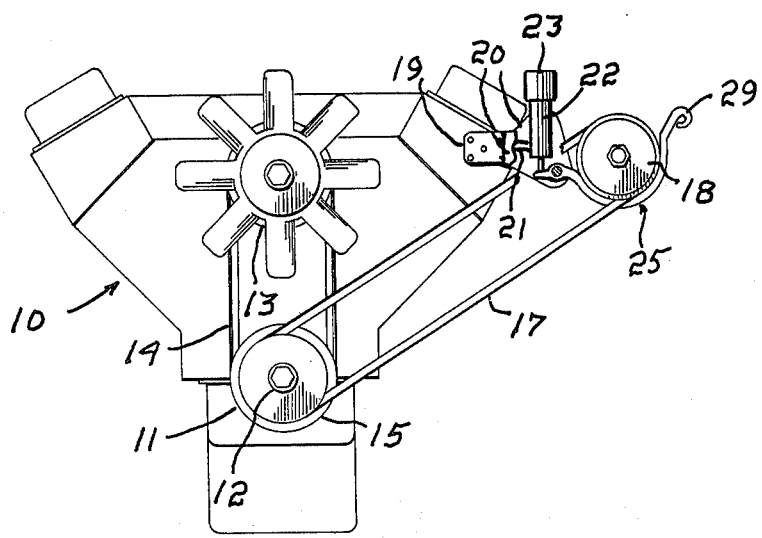

A truck engine, generally indicated at 10, has, as is conventional, a pulley 11 fixed on the exposed end of the crank-shaft 12 by which the fan pulley 13 is driven by a belt 14. Another pulley 15 is fixed on the outer end of the shaft 12 thus to enable the pump 16 of an hydraulic system to be driven by the engine 10 when a belt 17 is trained about the pulley 15 and the pump pulley 18. Truck engines are usually provided with tapped holes to enable such pumps to be attached thereto in an appropriate position.

A power take-off in accordance with the invention has a pump-supporting bracket 19 attached to the engine utilizing the tapped holes above referred-to and it includes an offset mount, having side walls 20 and a transverse spacer 21. The lower end of a vertical tubular case 22 is welded to the side walls 20 of the mount. A cap 23 is threaded on the upper end of the case 22 and is shaped and dimensioned to enable it to be securely gripped and turned in one direction or the other to adjust the tension of the coil compression spring 24 which it backs.

An arm generally indicated at 25 has a transverse bore 26 establishing a short inner or rear portion 25A provided with a concave seat 27 and a long outer curved portion 25B provided with a concave seat 28 for the pump 16 and an upwardly disposed hand grip 29 at its outer end extending away from and somewhat above the pump 16. The arm 25 is dimensioned to fit between the bracket side walls 20 and to freely receive a bolt 30 and be supported by bushings 31 carried thereby with washers 32 between the side walls 20 and the arm at the ends of the bore 26. The bolt 30 has a threaded end exposed outside a side wall 20 to receive a nut 33.

The outer curved arm portion 25B has slots 34 at opposite ends of the pump seat 28 with each receiving and retaining the flanged end of the appropriate one of the straps 35, 36 by which the pump 16 is secured to the arm once their proximate flanged ends are tightly bolted together.

Figure 2:
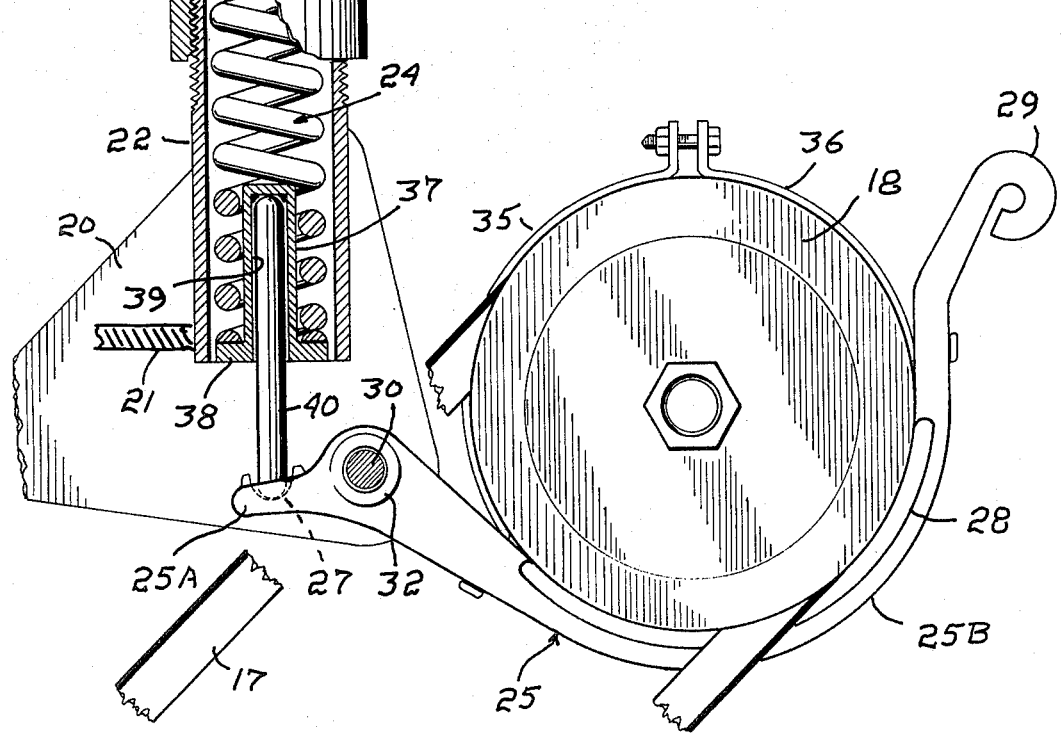
FIG. 2 is a partly sectioned front view, on an increase in scale, of the take-off.

In accordance with the invention, the connection between the spring 24 and the arm portion 25A includes, see FIG. 2, a holder 37 having a bottom flange 38 which is a free fit in the case 22 and against which the bottom turn of the spring 24 bears with the extremity of the spring wire flattened so that the spring pressure on the flange 38 is uniform circumferentially. The holder 37 is of sufficient length and is dimensioned to be freely received within several turns of the spring 24 and has an axial bore 39 opening through its flanged end with the closed end of the bore concave. A steel rod 40, the ends of which are rounded, has its upper portion extending into the holder bore 39 with its upper rounded end seated in the concave upper end thereof and its lower portion exposed and its lower rounded end held in the seat 27. In practice, the rod 40 is four inches long and the holder 37 is dimensioned so that about one and three-eighths inches of the rod is normally exposed.

When the take-off is installed and the belt 17 trained about the pulleys 15 and 18, the cap 23 is turned to so tension the spring 24 as to tighten the belt 17 against slipping. Should it no longer be necessary to use the hydraulic system, the pump 16 can be quickly and easily placed out of service by depressing the outer end of the arm 25 to an extent such that the belt 17 can be freed from both pulleys 15 and 18 and removed and stored for later use.

Space limitations determine the length of the arm 25 but the connection between the spring 24 and the inner arm portion 25A enables that portion to be short with the lower end of the spring case 22 close to the pivot axis of the arm 25. In practice, the distance between the pivot axis and the center of the seat 27 is about one and one-quarter inches enabling the distance between the hand grip and the pivot axis, as measured directly, to be about eight inches.

The mechanical advantage thus afforded the operator of the truck enables him easily, using but one hand, to depress the arm 25 and hold it depressed with the other hand free to remove or replace the belt 17 even though the spring pressure is in the order of 645 to 950 pounds. In practice, the spring is about six inches in length with its wire size five-sixteenths of an inch. The outside diameter of the spring is one and one-half inches.

While the arm 25 may be depressed by pushing down on the pump, the mechanical advantage is then reduced to about three to one.

We claim:

1. A power take-off unit attachable to an engine to support a pulley equipped pump of a hydraulic system in a position to be connected by a belt to a pulley on the crankshaft of a vehicle engine, said unit including a bracket attachable to said engine above and at one side of said shaft pulley, an arm, a pivotal connection between said arm and said bracket enabling said arm to swing in a vertical plane normal to the axis of the shaft and establishing a short inner end arm portion including a seat and a substantially longer outer arm portion including a manually engageable end and an intermediate concave seat, means operable to secure said pump to said concave seat with the pump pulley in transverse alignment with the shaft pulley, adjustable resilient means supported by said bracket and including an upwardly extending, adjustably backed coil spring the lower end of which is close to but above the seat in the shorter arm portion and said pivotal connection, a rod entrant of the seat in the shorter arm portion, and a connection between said rod and the lower end of said spring transmitting the pressure of said spring to the arm through the rod, said resilient means yieldably opposing movement of said pump towards said shaft pulley from a first position into a second position in which a belt may be placed in trained engagement with both pulleys or removed therefrom and in said first position, providing wanted tension on the belt, the distance between said pivotal connection and said manually engageable end portion of said arm being enough greater than the distance between said connection and the seat of the inner end of the arm such that mechanical advantage is afforded the user that the resistance of said resilient means encountered moving and holding the pump in said second position can be overcome with one hand while removing or replacing the belt with the other hand.

2. The power take-off of claim 1 in which the ratio between the pivot axis and the manually engageable end and the pivot axis and the seat engaged by the spring backed rod is in the neighborhood of 6:1.

3. The power take-off of claim 1 in which the mechanical advantage afforded the user is in the neighborhood of at least 3:1.

4. The power take-off of claim 1 in which the bracket includes side walls between which the arm extends and to which the arm is pivotally connected, the adjustable resilient means including a case for said spring extends downwardly between said walls and secured thereto with the lower end of the case close to but above the pivotal connection, a cap is threaded on the case and is operable to adjust the spring tension, and said manually engageable arm end extends away and upwardly from the upper portion of the pump but below the level of the cap.

5. The power take-off of claim 1 in which the connection between the spring and the rod is a tubular holder that fits freely within a plurality of turns of the spring and includes an end flange engaged by the lower end thereof, said holder having an axial bore in which a substantial lengthwise portion of the rod is received and which is dimensioned to enable the rod to tilt relative thereto to a limited extent as the arm is pivoted between said two positions.

6. The power take-off of claim 5 in which the ends of the rod are rounded and the inner end of the holder bore and the seat of the arm with which the rod is engaged are both concave centering seats.

* * * * *